US011156256B2

(12) United States Patent
Leonard et al.

(10) Patent No.: US 11,156,256 B2
(45) Date of Patent: Oct. 26, 2021

(54) HYDRAULIC CALIPER ASSEMBLY

(71) Applicant: Ausco Products, Inc., Benton Harbor, MI (US)

(72) Inventors: Nancy L. Leonard, Dowagiac, MI (US); Brian P. Dennis, Kalamazoo, MI (US); Norman D. Crawford, St. Joseph, MI (US); Kenneth A. Dodd, Dowagiac, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 18 days.

(21) Appl. No.: 16/561,201

(22) Filed: Sep. 5, 2019

(65) Prior Publication Data
US 2020/0080603 A1 Mar. 12, 2020

Related U.S. Application Data

(60) Provisional application No. 62/728,285, filed on Sep. 7, 2018, provisional application No. 62/728,122, filed
(Continued)

(51) Int. Cl.
*F16D 55/225* (2006.01)
*F16D 55/227* (2006.01)
(Continued)

(52) U.S. Cl.
CPC ......... *F16D 55/227* (2013.01); *F16D 55/228* (2013.01); *F16D 65/0056* (2013.01); *F16D 65/0068* (2013.01); *F16D 65/092* (2013.01); *F16D 65/095* (2013.01); *F16D 65/183* (2013.01); *F16D 65/44* (2013.01); *F16D 66/02* (2013.01); *F16D 2055/0008* (2013.01); *F16D 2055/0016* (2013.01); *F16D 2065/383* (2013.01); *F16D 2121/04* (2013.01);
(Continued)

(58) Field of Classification Search
CPC .................................................. F16D 55/228
USPC ..................... 188/72.3–72.5, 73.39, 73.46
See application file for complete search history.

(56) References Cited

U.S. PATENT DOCUMENTS 7,597,178 B2 * 10/2009 Dennis .................. F16D 55/228
188/72.4
8,127,897 B2 * 3/2012 Baldeosingh ........... F16D 59/02
188/72.3
(Continued)

OTHER PUBLICATIONS

*Disc Brake Pads*; http://www.absfriction.com/disc; Wayback Machine archive http://web.archive.org/web/20141016201951/http://www.absfriction.com/disc: publication date: Oct. 16, 2014.
(Continued)

*Primary Examiner* — Christopher P Schwartz
(74) *Attorney, Agent, or Firm* — Renner Kenner Greive Bobak Taylor & Weber

(57) ABSTRACT

A hydraulic caliper assembly includes a caliper brake housing including two opposing pairs of two piston assemblies, each of the pairs of two piston assemblies adapted to place a respective stator assembly of a pair of stator assemblies in a braking position, where the caliper brake housing is a unitary, cast component having an internal fluid porting system fluidly coupling each of the piston assemblies with a source of hydraulic fluid, and where each of the piston assemblies have a common configuration.

11 Claims, 13 Drawing Sheets

Related U.S. Application Data on Sep. 7, 2018, provisional application No. 62/728,448, filed on Sep. 7, 2018.

(51) Int. Cl.

| | |
|---|---|
| *F16D 66/02* | (2006.01) |
| *F16D 65/44* | (2006.01) |
| *F16D 65/00* | (2006.01) |
| *F16D 65/18* | (2006.01) |
| *F16D 65/092* | (2006.01) |
| *F16D 65/095* | (2006.01) |
| *F16D 55/228* | (2006.01) |
| *F16D 121/06* | (2012.01) |
| *F16D 55/00* | (2006.01) |
| *F16D 65/38* | (2006.01) |
| *F16D 121/04* | (2012.01) |
| *F16D 127/02* | (2012.01) |
| *F16D 125/06* | (2012.01) |
| *F16D 125/08* | (2012.01) |
| *F16D 125/10* | (2012.01) |

(52) U.S. Cl.
CPC ...... *F16D 2121/06* (2013.01); *F16D 2125/06* (2013.01); *F16D 2125/08* (2013.01); *F16D 2125/10* (2013.01); *F16D 2127/02* (2013.01); *F16D 2250/0069* (2013.01); *F16D 2250/0084* (2013.01)

(56) References Cited

U.S. PATENT DOCUMENTS

| | | | | |
|---|---|---|---|---|
| 8,261,889 | B2* | 9/2012 | Itsuaki | F16D 55/228 188/72.4 |
| 8,272,484 | B1* | 9/2012 | Dennis | F16D 55/228 188/72.5 |
| 8,662,260 | B2* | 3/2014 | Baldeosingh | F16D 65/12 188/72.7 |
| 2009/0250300 | A1* | 10/2009 | Bosco, Jr. | F16D 65/092 188/250 B |
| 2012/0160616 | A1* | 6/2012 | Passalacqua | F16D 69/0408 188/1.11 W |
| 2015/0219171 | A1* | 8/2015 | Kawamata | B22D 29/001 188/72.5 |
| 2018/0149219 | A1* | 5/2018 | Noh | B22D 25/02 |
| 2019/0024733 | A1* | 1/2019 | Lee | F16D 65/0068 |

OTHER PUBLICATIONS

*Bendix® Fleet Metlok®*; http://www.bendix-brakes.com/bendix_fleet_metlok.php; Wayback Machine archive http://web.archive.org/web/20151112093106/http://www.bendix-brakes.com/bendix_fleet_metlok.php; publication date: Nov. 12, 2015.

*Mico® Caliper Disc Brakes*; https://www.mico.com/products/brakes/caliper-disc-brakes: Wayback machine archive http://web.archive.org/web/20141018053739/https://www.mico.com/products/brakes/caliper-disc-brakes: publication date: Oct. 18, 2014.

*Mico® Caliper Disc Brakes Catalog*; Form No. 84-515-535; Mar. 31, 2017.

*Mico® Caliper Disc Brakes Product Bulletin*; Form No. 80-500-007; Oct. 4, 2011.

*Brake Pad Chamfers, Slots and Shapes: Controlling Brake Noise*; Brake & FrontEnd; Mar. 22, 2017.

\* cited by examiner

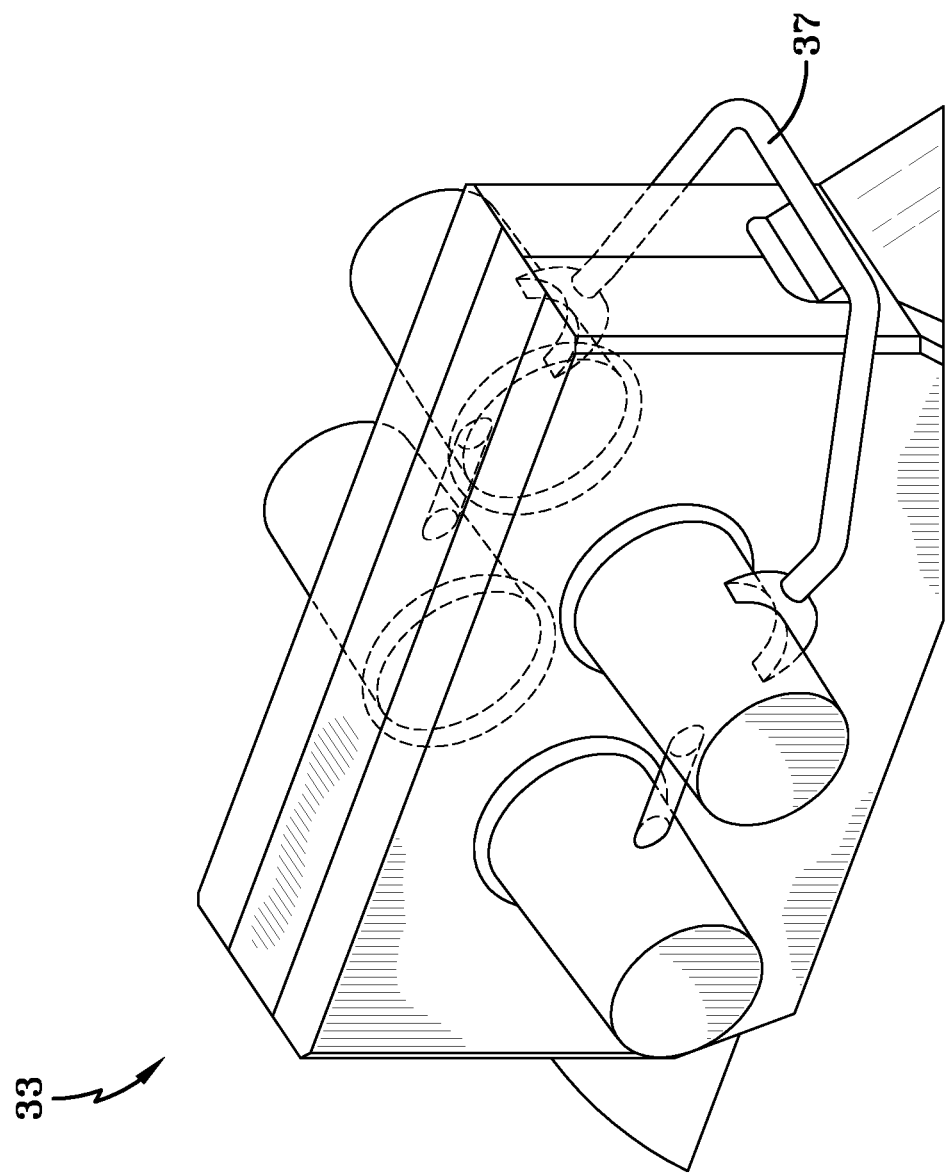

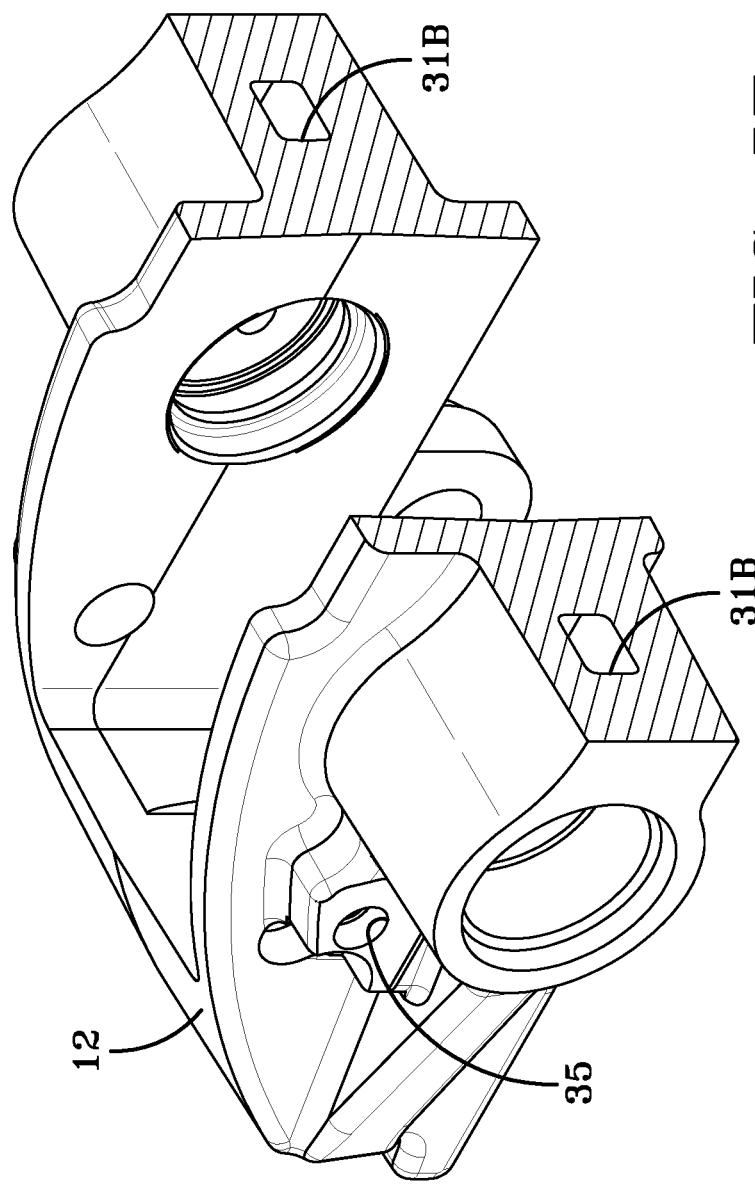

HYDRAULIC CALIPER ASSEMBLY

CROSS REFERENCE TO RELATED APPLICATIONS

This application claims the benefit of U.S. Provisional Application No. 62/728,285, filed Sep. 7, 2018; U.S. Provisional Application No. 62/728,122, filed Sep. 7, 2018; and U.S. Provisional Application No. 62/728,448, filed Sep. 7, 2018, which are each incorporated herein by reference.

TECHNICAL FIELD

This invention relates to a hydraulic caliper assembly. More particularly, this invention relates to a hydraulic caliper assembly that includes a self-contained hydraulic fluid system and easy access to stator assemblies.

BACKGROUND ART

To service certain drum brakes, such as those used in mining and other applications, problems may arise. First, in some instances, a star wheel must be rotated in order to adjust the position of a brake shoe inside the drum to thereby loosen the brake shoe. Access to the star wheel component may be thru a slot on a back side of a backing plate of the drum brake. Rotating the star wheel may be inhibited by mud and mine debris caked onto the back plate and packed into the slot. There may also be a rubber plug that is installed in this location to keep out the mud, water and other debris. The rubber plug often is not replaced during service. The service technician may remove it and throw it on the floor.

In certain existing brakes, once the star wheel is released the heavy drum can be removed by removing bolts that secure it. Getting to the head of the bolts may require more debris removal and then breaking the bolts loose. Once the drum is removed residual mining debris may need to be cleaned inside the brake in order to loosen and remove springs, brake shoe bolts, and finally dislodge and remove the brake shoes. Once the brake shoes are out and reassembly of the brake occurs, a user will need to ensure components not being replaced are still functional or replace them at this service operation. Springs, wheel cylinders, star wheels, clips and bolts may be need to be inspected for wear and corrosion and replaced if needed or cleaned up to reassemble the brake.

Once the brake is reassembled and reinstalling the drum is desired, the shoes need to be adjusted into position. This part of the process is generally done one of three ways. One way is to use a gauge to position the shoes adjusting the star wheel until the gauge is met, then slide the drum on. Another is to put the drum on and adjust the star wheel until there is a bit of drag where the shoes contact the drum. The last option is to install the drum and pump the brakes until there is resistance.

To service an OEM automotive caliper, it generally must be removed from either an anchor bracket or mounting bracket. To remove the caliper, the fasteners must be removed first, which fasteners may include mounting bolts, mounting pins, sleeve bushings, boots, retaining pins, and combinations. These components are generally replaced with each service. Once removed, the caliper may be generally left to hang from the brake line, or may be awkwardly placed on a leaf spring where it inevitably will fall and damage the brake line, the connector, or both.

The next task may be to retract the piston(s). The existing worn shoe and linings may be removed and replaced with new ones. Any clips, wear indicators, spring retainers, dampening shims generally need removed, inspected and replaced as necessary. The caliper can then be reassembled and reinstalled into the bracket. If anything else was damaged in the process of service, those items will need to be addressed. Lastly, the calipers will need to be bled to remove air from the line.

There remains a need for a hydraulic caliper assembly that offers one or more improvements over the prior art.

SUMMARY OF THE INVENTION

In general, a hydraulic caliper assembly and corresponding methods are provided.

In accordance with an aspect of the invention, the hydraulic caliper assembly may include a caliper brake housing including two opposing pairs of two piston assemblies, each of the pairs of two piston assemblies adapted to place a respective stator assembly of a pair of stator assemblies in a braking position, wherein the caliper brake housing is a unitary, cast component having an internal fluid porting system fluidly coupling each of the piston assemblies with a source of hydraulic fluid, and wherein each of the piston assemblies have a common configuration.

In accordance with another aspect of the invention, a method of manufacturing a caliper brake housing for the hydraulic caliper assembly may include providing a casting core model having a solid porting system component, wherein the solid porting system replicates a desired internal fluid porting system to be formed within a caliper brake housing, and casting the caliper brake housing with the casting core model, such that the caliper brake housing retains the internal fluid porting system of a hollow configuration.

It is an object of one aspect of the present invention to provide a hydraulic caliper assembly providing easy serviceability by reducing complexity thru component reduction, easy machinability, assembly, and serviceability.

It is an object of another aspect of the present invention to provide a hydraulic caliper assembly, as above, providing easy access to service the piston and piston seal using simple tools.

It is an object of another aspect of the present invention to provide a hydraulic caliper assembly, as above, having self-contained hydraulic fluid communication channels and easy access porting.

It is an object of another aspect of the present invention to provide a hydraulic caliper assembly, as above, that offers easy replacement of stator assemblies, not requiring removal of the caliper from the mounting bracket, and viewable stator linings for knowing when replacement is needed.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

FIG. 5A is a perspective view of a casting core used to develop a fluid channel of the hydraulic caliper assembly according to the concepts of the present invention.

FIG. 5E is a widthwise perspective sectional view of the caliper brake housing of the hydraulic caliper assembly according to the concepts of the present invention.

DETAILED DESCRIPTION OF THE INVENTION

Figure 3:
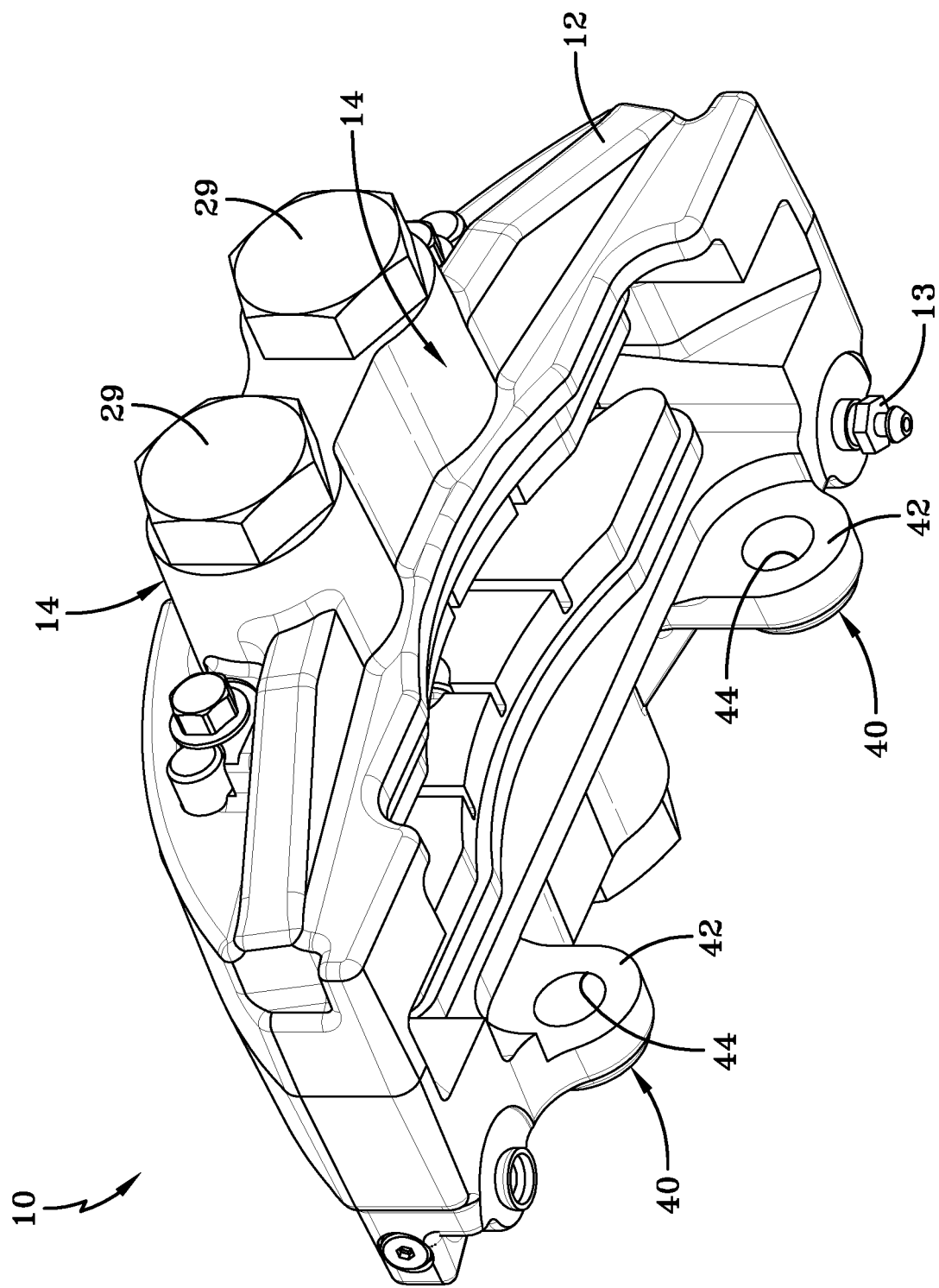
FIG. 3 is a perspective bottom view of the hydraulic caliper assembly according to the concepts of the present invention.

With reference to the Figures, a hydraulic caliper assembly according to the concepts of the present invention is generally indicated by the numeral 10. Hydraulic caliper assembly 10, which may also be described as caliper brake 10 or hydraulic caliper brake 10, includes a caliper brake housing 12. Caliper brake housing 12, includes a plurality of piston assemblies, generally indicated by the numeral 14, in fluid communication with a source of hydraulic fluid, which may be provided by one or more fluid ports 13, as seen in FIG. 3. Caliper brake housing 12, which may also be referred to as caliper housing 12, may be a unitary, or single, cast component.

The plurality of piston assemblies 14 may include two opposing pairs of two piston assemblies 14, as shown in the Figures. Each of the plurality of piston assemblies 14 may be of similar configuration, which may also be described as a common configuration. This similar configuration of the plurality of piston assemblies 14 may allow for easier servicing and repair thereof. This similar configuration may include the plurality of piston assemblies 14 being machined to accept a similar set of piston sealing components, which may also be described as a common set of piston sealing components. Moreover, this similar configuration may also allow for easier assembly of the plurality of piston assemblies 14, as each set of piston sealing components is assembled in the same manner.

Figure 4:
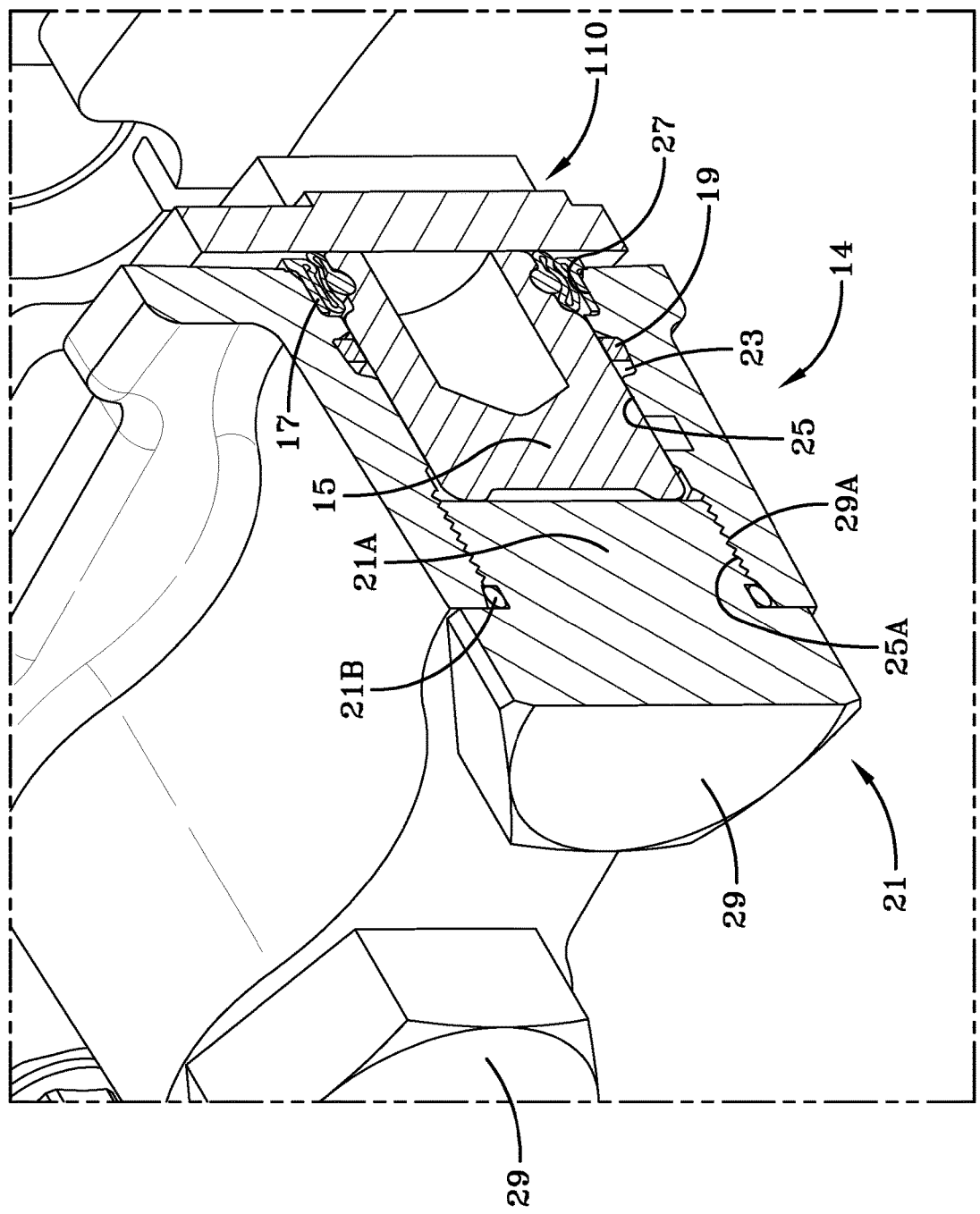
FIG. 4 is a perspective sectional view of one of the piston assemblies of the hydraulic caliper according to the concepts of the present invention.

As seen in FIG. 4, the piston sealing components of piston assembly 14 may include a piston 15, a piston boot 17, a piston seal 19, and a piston O-ring plug 21. Piston seal 19 is within a piston groove 23. Piston groove 23 is formed within a piston bore 25 of caliper housing 12. Piston 15 is slideable within piston bore 25 and carries piston boot 17 on the nose of piston 15. Piston boot 17 is provided within a piston boot groove 27 in caliper housing 12. Piston boot 17 is a secure fit, which may also be described as pressed in, within piston boot groove 27. Piston boot 17 may include a ring insert, which may also be described as a 'steel can' portion, and a corrugated portion, which may be made from silicone or rubber, secured to the ring insert. This configuration of piston boot 17 secures the fit of piston boot 17 within piston boot groove 27.

Piston O-ring plug 21 includes a plug body portion 21A with threading 29A generally corresponding with threading 25A in piston bore 25. As such, piston O-ring plug 21 may be screwed into place in piston bore 25.

Piston O-ring plug 21 includes a protrusion 29 extending from plug body portion 21A. The outer perimeter of protrusion 29 may extend wider than the outer perimeter of plug body portion 21A. This may include the outer perimeter of protrusion 29 extending wider than the entire outer perimeter of plug body portion 21A. Protrusion 29 may be hexagonal shaped, as shown in the Figures, or may be of other suitable configuration, such as square shaped. Protrusion 29 may be of a common width and height such that protrusion 29 can be manipulated with a common tool, such as a wrench. Using protrusion 29, piston O-ring plug 21 may be removed in order to service the respective piston assembly 14. A distal end of protrusion 29 may abut or be in close proximity to a distal end of piston 15. An O-ring 21B may be utilized between protrusion 29 and threading 25A, 29A.

For assembly of piston assemblies 14, as best seen in FIG. 4, the respective piston sealing components may be assembled in a particular order. First, piston seal 19 may be placed in a piston groove 23, which is in a piston bore 25 of caliper housing 12. Piston 15 may then be put into piston bore 25. Then, piston boot 17 may be slid onto the nose of the piston 15 and piston boot 17 may be set into a piston boot groove 27 in caliper housing 12. Lastly, piston O-ring plug 21, which may carry O-ring 21B, may be screwed into place in piston bore 25.

As suggested above, a pair of piston assemblies 14 may be present on each side of caliper housing 12. Caliper housing 12 may therefore be described as having an open end dual opposed piston bore configuration. This configuration may allow for inexpensive common tooling and fixturing to be used during the machining of caliper housing 12. Again, serviceability of caliper housing 12 and piston assemblies 14 may be easier based on each respective piston chamber of the plurality of piston assemblies 14 being machined in a similar configuration.

Figure 1:
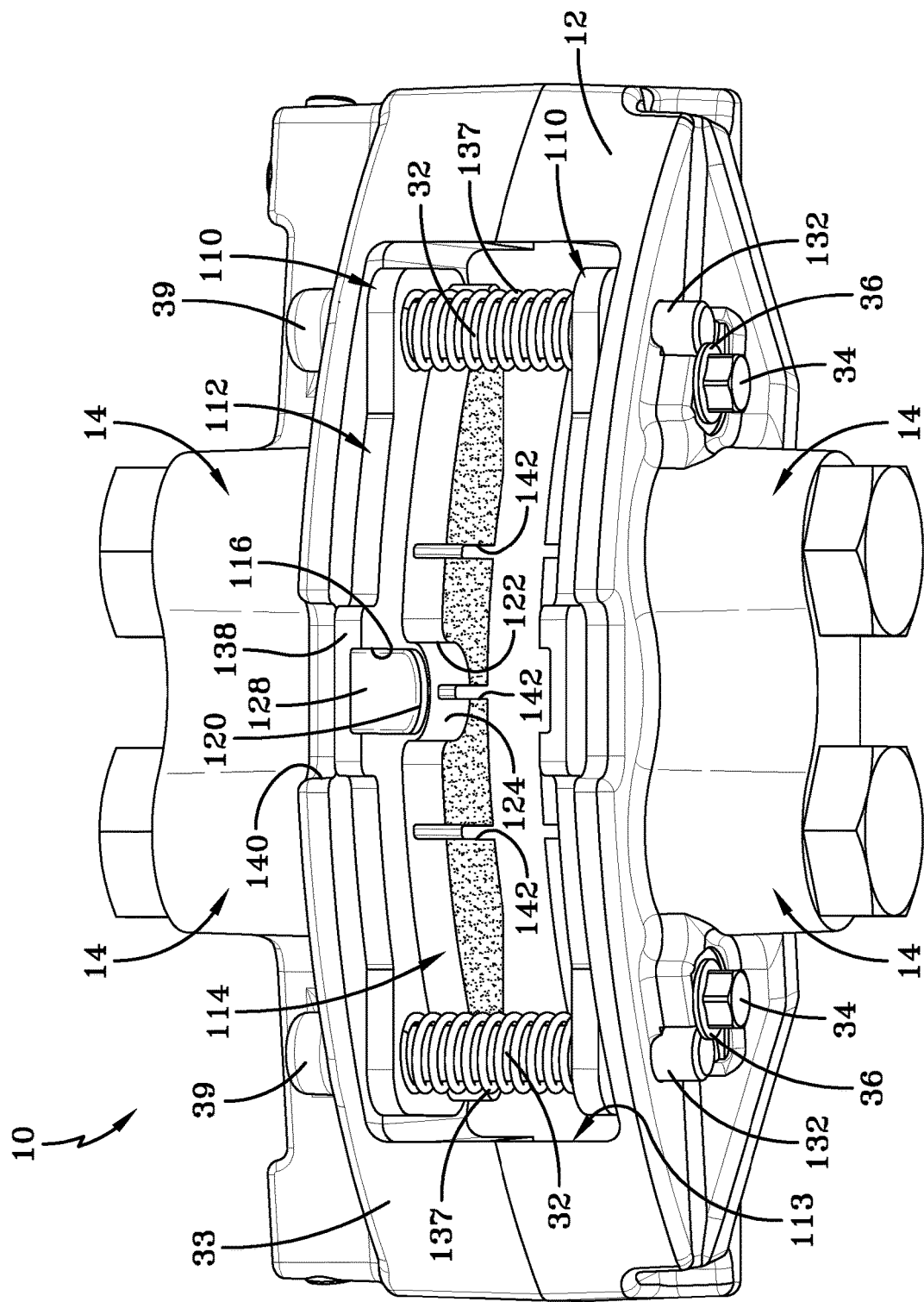
FIG. 1 is a perspective top view of a hydraulic caliper assembly according to the concepts of the present invention.

As perhaps best seen in FIG. 1, caliper housing 12 includes a recess 113 positioned over stator assemblies 110. This may also be described as caliper housing 12 not including a bridge positioned over stator assemblies 110. Other generally known brakes may include a housing having a bridge over the stator assemblies, which bridge may serve certain functions for those particular brakes. Here, with caliper housing 12 including recess 113, a user is able to more easily access stator assemblies 110 as there is nothing obstructing access to stator assemblies 110 from this location, which may be described as the top, of caliper housing 12. This may be advantageous for providing access to stator assemblies 110 for repair thereof, as will be further described herein below.

Figure 5B:
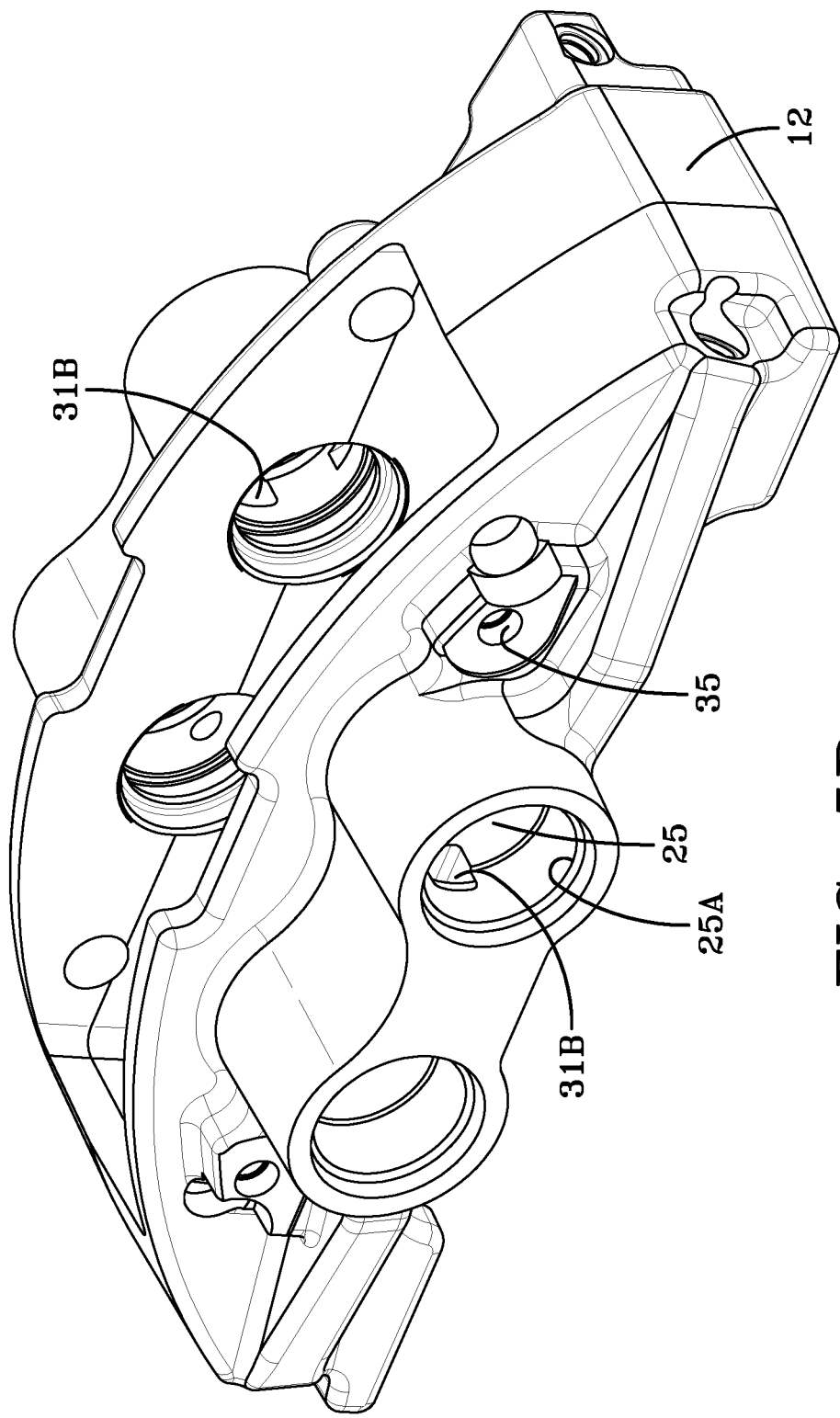
FIG. 5B is a perspective view of the caliper brake housing of the hydraulic caliper assembly according to the concepts of the present invention.
Figure 5C:
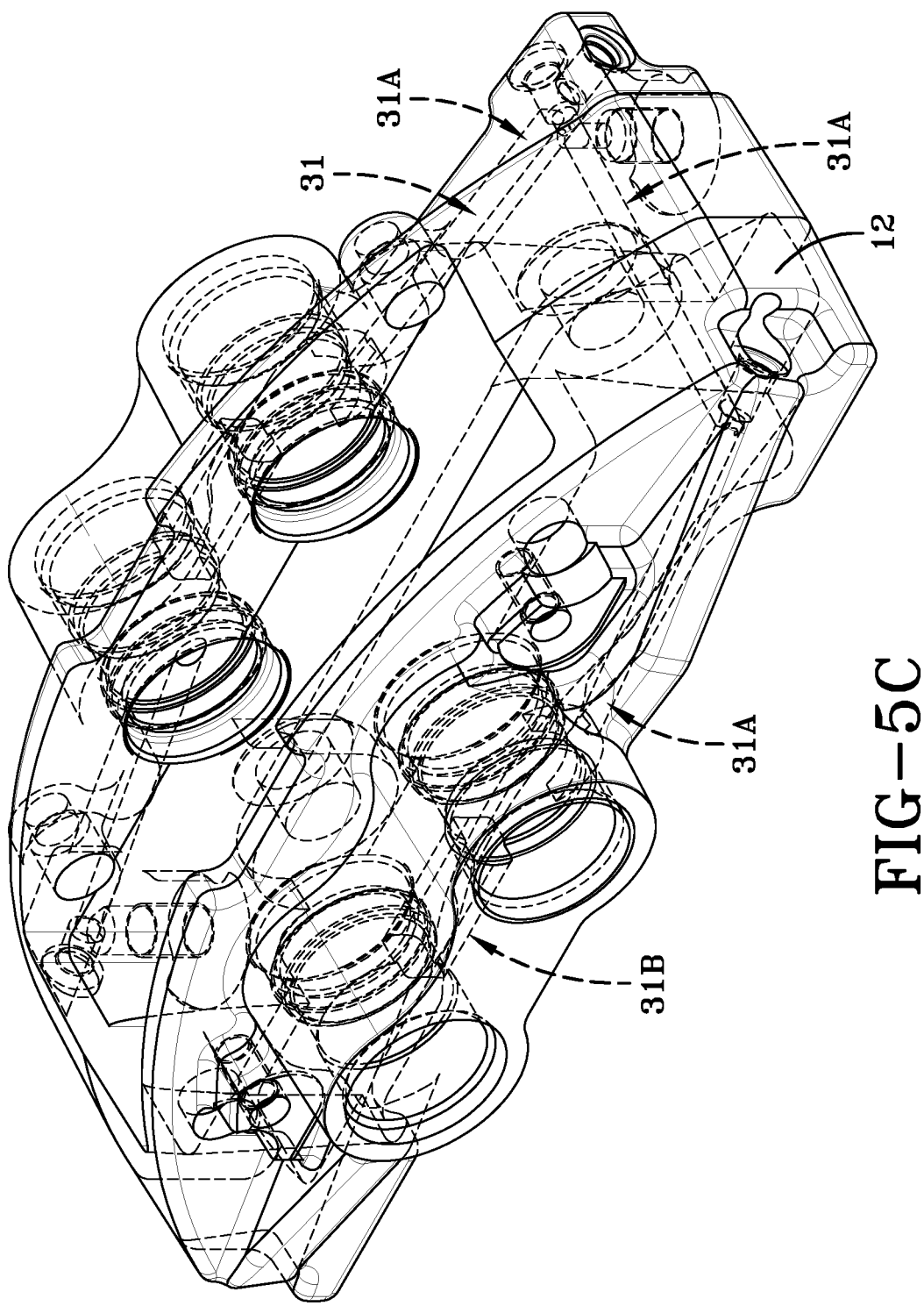
FIG. 5C is a see-through perspective view of the caliper brake housing to better show the fluid channel of the hydraulic caliper assembly according to the concepts of the present invention.
Figure 5D:
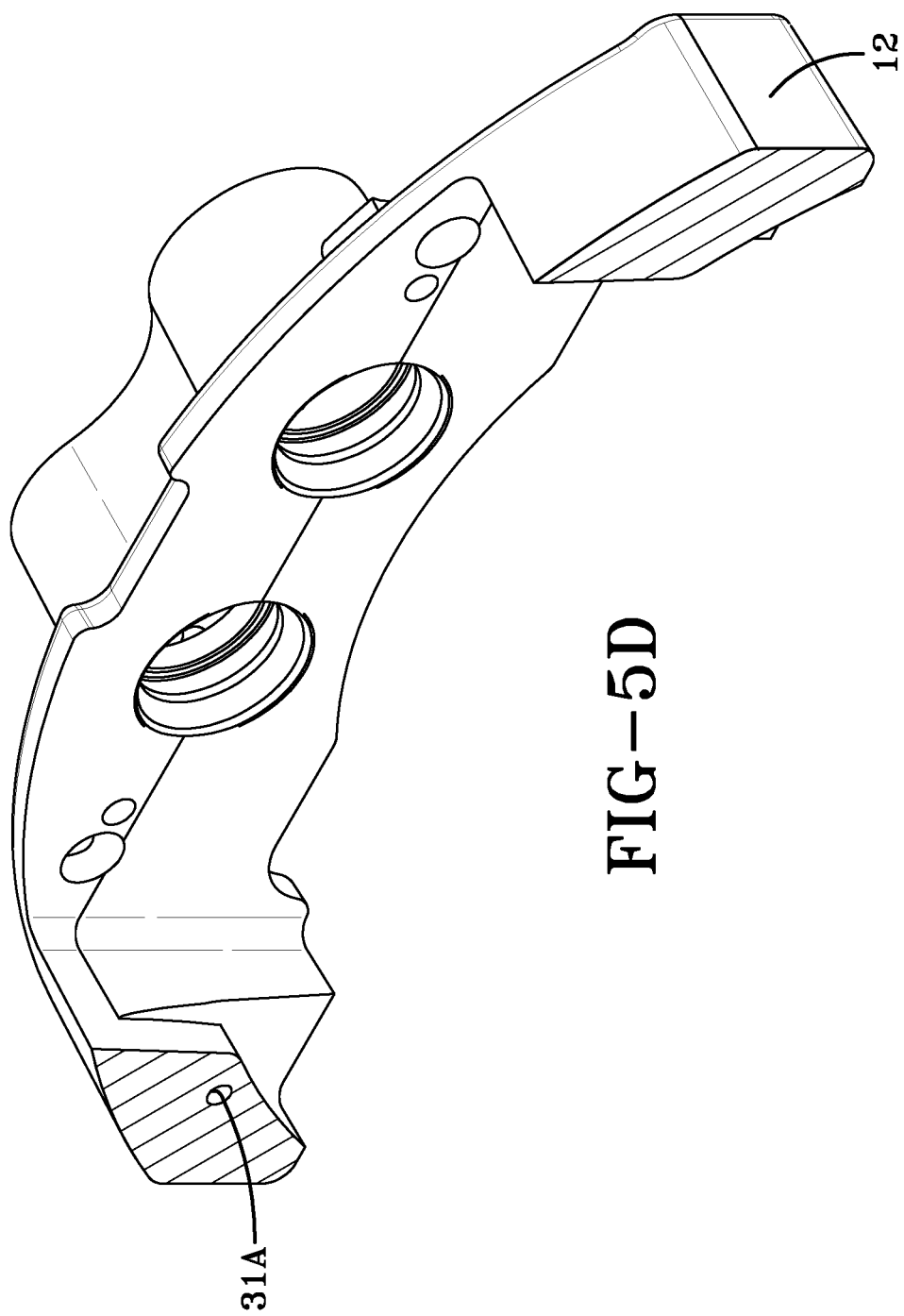
FIG. 5D is a lengthwise perspective sectional view of the caliper brake housing of the hydraulic caliper assembly according to the concepts of the present invention.
Figure 6:
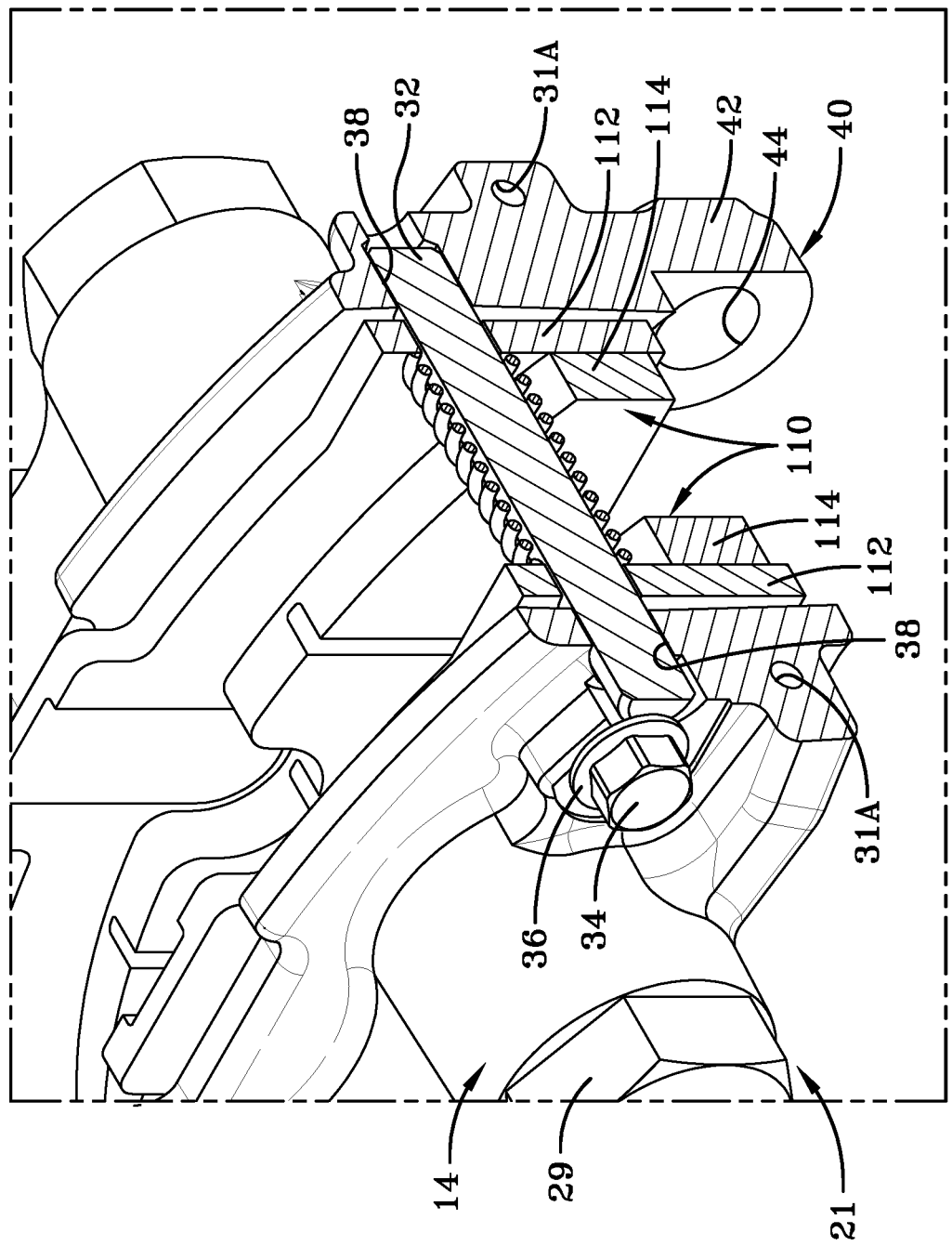
FIG. 6 is a perspective sectional view of a torque pin of the hydraulic caliper assembly according to the concepts of the present invention.

Referring now to FIGS. 5A-6, in order to provide hydraulic fluid to the plurality of piston assemblies 14, caliper housing 12 includes an internal fluid porting system 31 fluidly coupling each piston assembly 14 with a source of hydraulic fluid by fluid port 13. Internal fluid porting system 31, which may also be referred to as internal fluid system 31 or internal porting system 31, puts each of the piston assemblies 14 in fluid communication with each other.

As shown in FIG. 5A, internal porting system 31 may be made by using a casting core model 33. Casting core model 33 includes a solid porting system component 37 that replicates the 'inverse' of a desired internal porting system 31. As such, the casting of caliper housing 12 utilizing casting core model 33 forms internal porting system 31 within caliper housing as a hollow feature that replicates the configuration of solid porting system component 37. Said another way, internal porting system 31 is formed as a cast feature when casting the caliper housing 12 as a unitary cast component with casting core model 33. The casting of caliper housing 12 may be accomplished by any suitable casting technique. This may include pouring a material into a mold. In other embodiments, additive manufacturing may be utilized to form caliper housing 12 having hollow internal fluid porting system 31.

The casting of the caliper housing 12 with casting core model 33 develops hollow internal porting system 31 within caliper housing 12. Based on internal porting system 31 being internal to caliper housing 12, hydraulic caliper assembly 10 may avoid the use of several external hydraulic tubing and components that may otherwise be necessary. In one or more embodiments, hydraulic caliper assembly 10 may be devoid of hydraulic tubing external of caliper housing 12.

As best seen in FIGS. 5A-5E, internal fluid porting system 31 may be described based on the various fluid communication channels thereof. Internal fluid porting system 31 may include a channel 31A adapted to provide opposing piston assemblies 14 in fluid communication with each other. Internal fluid porting system 31 may include a channel 31B adapted to provide paired piston assemblies 14 in fluid communication with each other. As discussed elsewhere herein, internal fluid porting system 31 fluidly couples each piston assembly 14 with a source of hydraulic fluid. This may be accomplished by a variety of suitable configurations of channels 31A, 31B. For example, internal fluid porting system 31 may include a channel 31A between each of the opposing piston assemblies 14 and only one channel 31B between one of the pairs of piston assemblies 14. Alternatively, internal fluid porting system 31 may include a channel 31B between each of the paired piston assemblies 14 and only one channel 31A between one of the sets of opposing piston assemblies 14. In still other embodiments, internal fluid porting system 31 may include a channel 31A between each of the opposing piston assemblies 14 and a channel 31B between each of the paired piston assemblies 14.

Figure 2:
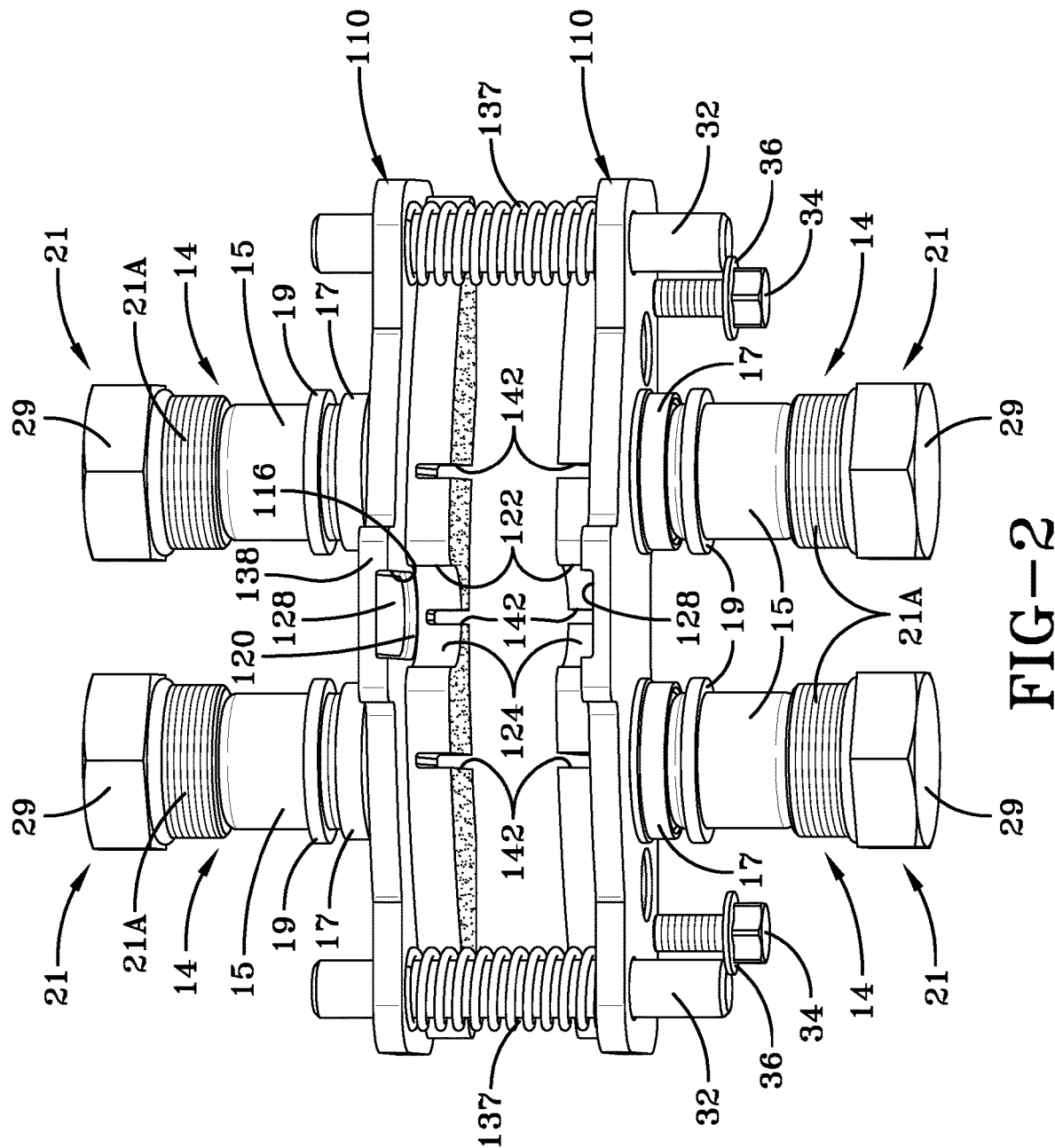
FIG. 2 is a perspective top view of the hydraulic caliper assembly, shown without a caliper brake housing to better show a plurality of piston assemblies, according to the concepts of the present invention.

As perhaps best seen in FIGS. 1, 2, and 5C, by way of providing hydraulic fluid to internal porting system 31, respective pairs of piston assemblies 14 are each adapted to move respective stator assemblies 110 of stator assembly pair 111 to a braking position by way of hydraulic fluid. Particularly, piston 15 of piston assembly 14 pushes stator assemblies 110 to the braking position. The structure and function of stator assemblies 110 will be further described herein below.

Stator assemblies 110 are secured within caliper housing 12 by a pair of torque pins 32, which may also be referred to as pins 32. In addition to retaining stator assemblies 110 in position of caliper housing 12, torque pins 32 also guide the travel of stator assemblies 110 toward a rotor (not shown). In other configurations, torque pins 32 may be adapted for providing additional functions for caliper brake 10.

Pins 32 are available for easy access for a user to service caliper brake 10. Pins 32 are held in place by a respective bolt 34 and a respective washer 36. For securing pin 32 against a back surface component 39, bolt 34 is retained within a threaded hole 35 within caliper housing 12. As seen in FIG. 6, a portion of washer 36 overlaps a portion of pin 32. Bolt 34 may include a common hexagonal head so that a common tool can be used to remove bolts 34. With bolts 34 removed, pins 32 can be subsequently removed by sliding pins 32 out, which removal may or may not be assisted with a suitable tool. Pins 32 should be resistant to the impact of stator assemblies 110 when caliper brake 10 is actuated. Pins 32 are slideably received within respective torque pin holes 38 in caliper housing 12. A respective spring 137 may be provided around each pin 32.

For mounting caliper brake 10, particularly stator assemblies 110 thereof, in operative relation to the rotor, caliper housing 12 includes a pair of mounting assemblies, generally indicated by the numeral 40. Each mounting assembly 40, which may also be referred to as mounting ears 40, includes a projecting arm 42, which may be generally circular shaped, having a hole 44 therethrough for receiving a fastener 46. Fastener 46 mounts caliper brake 10 to a bracket assembly 48, which includes a mounting protrusion 50 having a mounting hole 52 therethrough. In one or more embodiments, hole 44 and mounting hole 52 may include threads generally corresponding to threads of fastener 46. In these or other embodiments, fastener 46 may include a nut and bolt combination.

The structure and function of stator assemblies 110 will now be further described. With particular reference to FIGS. 1, 2, 7A, and 7B, stator pad assembly 110, which may also be described as stator assembly 110, includes a backing plate, generally indicated by the numeral 112, which carries a stator lining, generally indicated by the numeral 114, which may also be described as a stator pad 114. Stator pad 114 may be secured to backing plate 112 by way of an adhesive or other generally known means. Installation and removal of stator pad 114 may include utilizing integral molding holes 117 within backing plate 112. Integral molding holes 117 generally serve as anchor points for stator pad 114 material.

Backing plate 112 includes a slot 116 formed therein. Slot 116 may have a first end within a tab 138 of backing plate 112, which will be further described herein below with respect to the function of tab 138. Slot 116, which may also be referred to as release slot 116, may be formed in the center or the central portion of the width of backing plate 112. This may be described as slot 116 being aligned with the centerline of a pair of piston assemblies 14, which may also be described as pistons 14. A respective pair of piston assemblies 14 is provided for each stator assembly 110 and piston assemblies 14 are adapted to move stator assembly 10 to a braking position by way of hydraulic fluid.

Figure 7A:
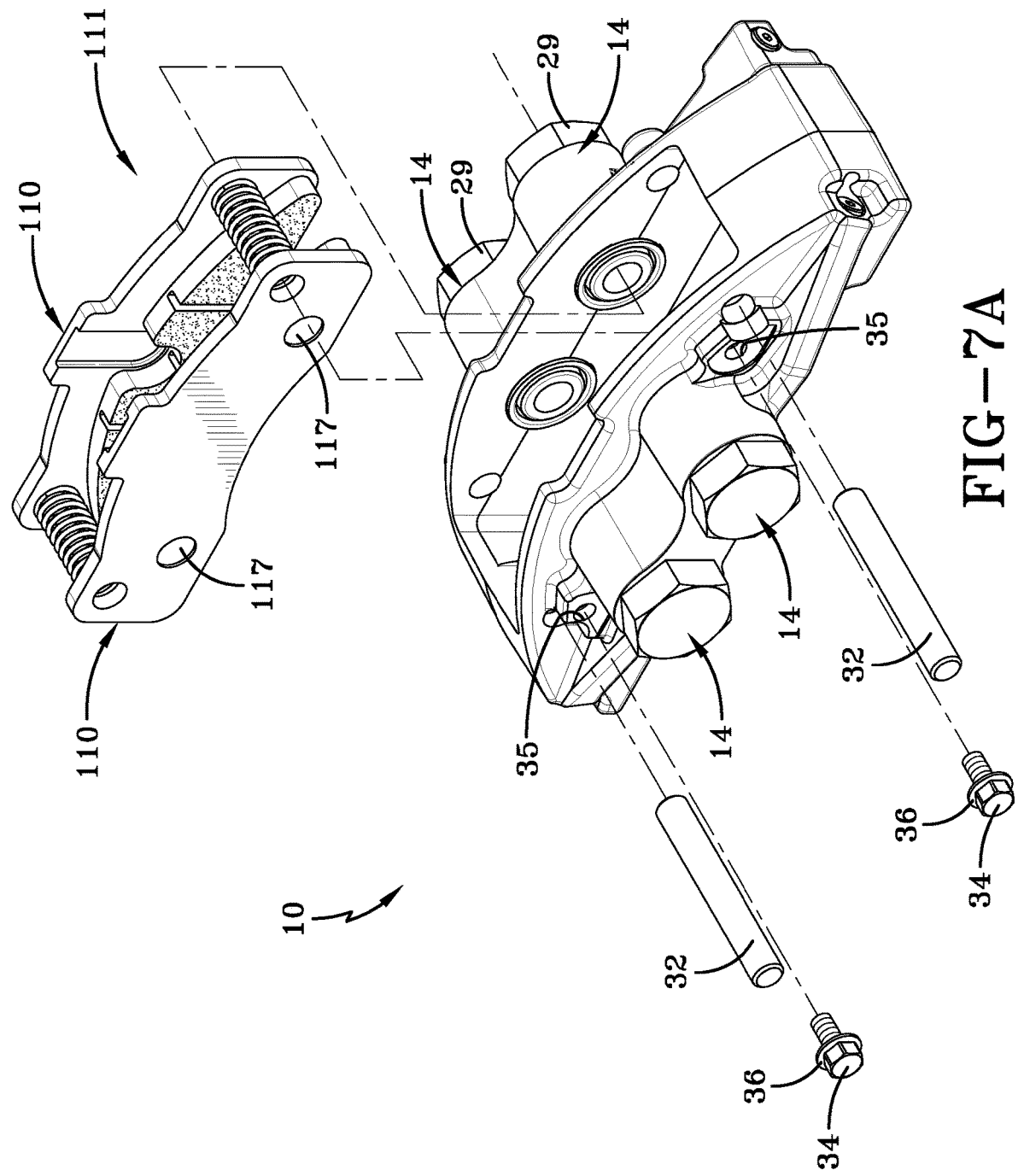
FIG. 7A is a perspective assembly view showing a pair of opposed stator assemblies removed from the hydraulic caliper assembly according to the concepts of the present invention.
Figure 7B:
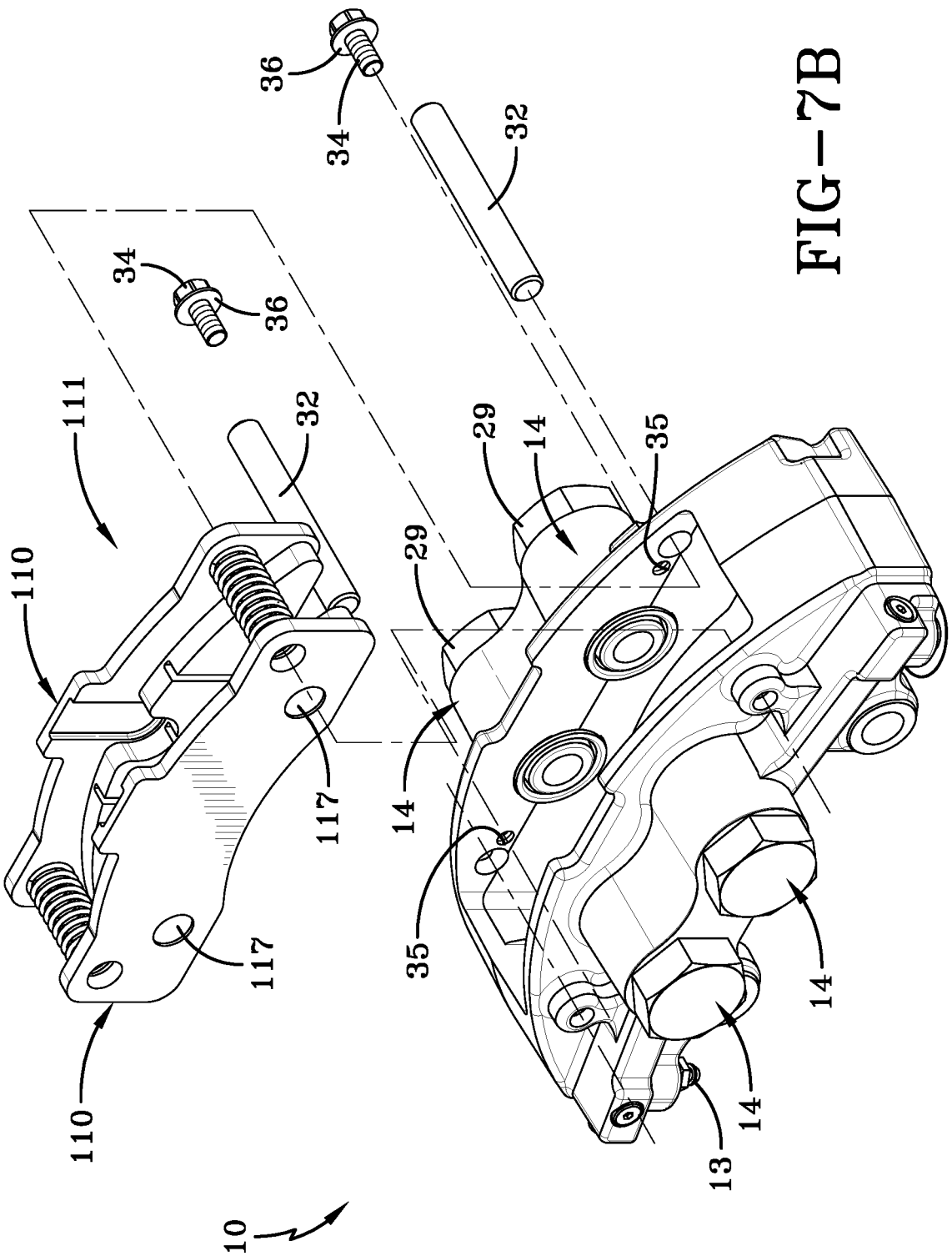
FIG. 7B is a perspective assembly view showing the pair of opposed stator assemblies removed from the hydraulic caliper assembly according to the concepts of the present invention.
Figure 8:
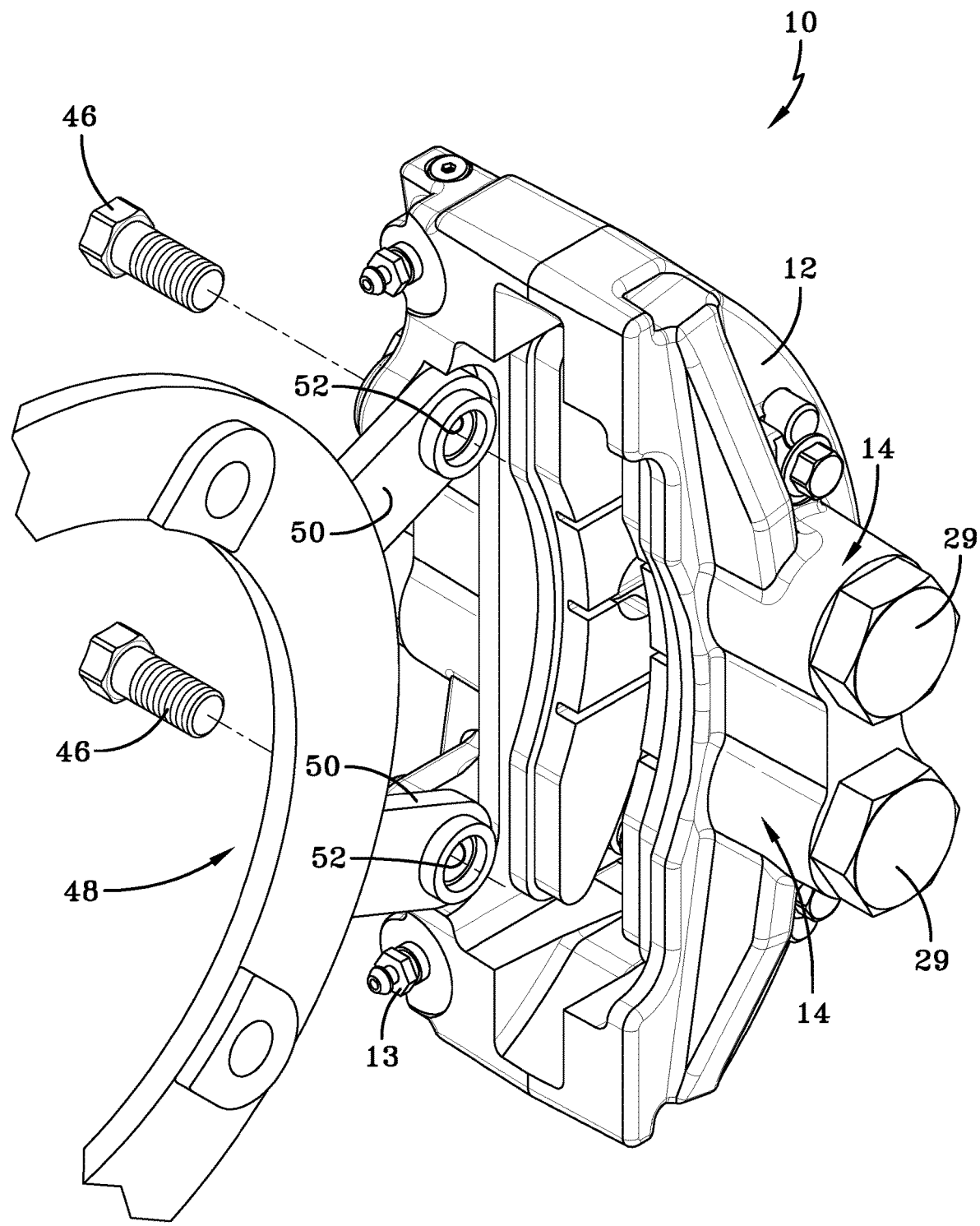
FIG. 8 is a perspective view of the hydraulic caliper assembly with a mounting bracket according to the concepts of the present invention.

Slot 116 extends only into a portion of backing plate 112. That is to say, slot 116 does not extend entirely through the length of backing plate 112, such that slot 116 extends to an end 120 within backing plate 112. End 120 may be a curved end, which may be in the particular shape of a semi-circle as shown in the Figures. In other embodiments, end 120 may be rectangular or another suitable shape. As best seen in FIGS. 7A and 7B, in pair 111 of opposed stator pad assemblies 110, slot 116 from one stator assembly 110 faces inward toward slot 116 of the other stator assembly 110.

In a corresponding position as end 120 and a lower portion of slot 116, stator lining 114 includes a slot 122 formed therein. Slot 122 may be formed in the center or the central portion of the width of stator lining 114. This may be described as slot 116 being formed in the centerline of the pair of piston assemblies 14. Slot 122 extends only into a portion of stator lining 114. That is to say, slot 122 does not extend entirely through the length of stator lining 114, such that slot 122 extends to an end 124 within stator lining 114. End 124 may be a curved end, which may be in the particular shape of a semi-circle. In other embodiments, end 124 may be rectangular or another suitable shape. As best seen in FIGS. 7A and 7B, in pair 111 of stator assemblies 110, slot 122 from one stator assembly 110 faces inward toward slot 122 of the other stator assembly 110.

In one or more embodiments, end 124 may be of the same or similar shape as end 120. That is to say, end 124 may aligned or substantially aligned with end 120. This may be useful for providing a constant surface for contacting a distal end of a tool with the constant surface, as will be further, discussed herein below.

End 124 of slot 122 may include a central wear slot 142 extending therefrom, which slot 142 is useful for knowing the condition of stator lining 114, as further discussed below. Central wear slot 142 with slot 122 together extend entirely through the length of stator lining 114. Though, as mentioned above, slot 122 itself does not extend entirely through the length of stator lining 114. It should be readily appreciated that slot 122 is of a different shape than the central wear slot 142.

In the configuration of caliper brake 10, when stator assemblies 110 require servicing, it is generally necessary to push back the respective pair of piston assemblies 14 with which stator assembly 110 is coupled. That is, stator assembly 110 needs to be moved toward the respective pair of piston assemblies 14.

To achieve this movement of stator assembly 110, a user may utilize a tool, which may be a screwdriver or crow bar or other suitable implement. A first end of the tool may be inserted into slot 116 and slot 122. The tool may be inserted until a distal end thereof contacts end 120 and/or end 124. Slot 116 may be said to define a tool-engaging surface 128 in backing plate 112. The user of the tool may contact the tool with tool-engaging surface 128 when the tool is inserted into slot 116 and slot 122.

Upon the tool contacting tool-engaging surface 128, the user causes the tool to apply sufficient force on tool-engaging surface 128 to thereby cause stator assembly 110 to move against the pair of piston assemblies 14. This thereby pushes back the pair of piston assemblies 14.

As suggested above, slot 116 and slot 122 are centrally located in the respective components. Thus, the force of the tool also acts centrally on the pair of piston assemblies 14. Advantageously, this causes consistent movement of piston assemblies 14 and avoids cocking piston assemblies 14 and otherwise damaging piston assemblies 14 and respective components thereof.

For servicing stator assemblies 110 of caliper brake 10, the hydraulic pressure normally supplied to internal fluid porting system 31 of caliper brake 10 is deactivated. Thus, the force of the tool against stator assemblies 110 is able to push back the respective piston assembly 14. This may also release any hydraulic pressure that may remain when caliper brake 10 is in the deactivated state. Once stator assemblies 110 move the respective piston assembly 14 by the tool as discussed above, piston assemblies 14 will remain in that position because no further hydraulic pressure is being supplied in this mode of caliper brake 10.

As suggested above, caliper brake 10 includes a pair of torque pins 32 for securing stator assemblies 110 within caliper brake housing 12. For servicing stator assemblies 110 once piston assemblies 14 are moved, one of the torque pins 32 may be removed from the respective torque pin holes 134 of stator assemblies 10 and the respective torque pin holes 38 within caliper housing 12. This may also include removing a respective spring 137 positioned around torque pin 32 and between the pair of stator assemblies 110.

Stator assemblies 110 may then be rotated about the other torque pin 32 (and spring 137) that remains within caliper housing 12. Stator assemblies 110 may be rotated away from caliper housing 12 of caliper brake 10 such that they can be accessed by a user for performing maintenance thereon. This maintenance may include replacing stator linings 114. In other embodiments, both of the torque pins 32 and both of the springs 137 may be removed to completely remove stator assemblies 110 from caliper brake 10.

Once maintenance of stator assemblies 110 is completed, stator assemblies 110 may be reassembled with caliper brake 10 in a reverse manner as described above, which includes reactivating the hydraulic pressure to piston assemblies 14. In this normal, non-maintenance operation of caliper brake 10, a portion of the wheel rotor is positioned between the pair of stator assemblies 110.

As suggested above, for assisting with ease of servicing stator assemblies 110, backing plate 112 may include tab 138 as an extension of backing plate 112. Tab 138 may particularly extend from a central position with respect to the width of backing plate 112. As discussed above, tab 138 includes a portion of slot 116, including a distal end of slot 116.

Tab 138 protrudes from backing plate 112 and extends far enough from backing plate 112 as to be outside of an outer perimeter of housing 12 of brake 10, as perhaps best seen in FIG. 6. This extension of tab 138 outside of caliper housing 12 enables tab 138 to be easily grabbed by a user for rotation and/or removal of stator assemblies 110. For additional ease, caliper housing 12 may include a slot 140, which may also be described as a depression 140, generally corresponding to the position of tab 138, such that tab 138 serves as an even longer extension from caliper housing 12.

For assisting a user with knowing when stator assemblies 110 need servicing, stator lining 114 may include one or more wear slots 142 formed therein. Any suitable number of wear slots 142 may be utilized. Stator assemblies 110 of brake 10 include three wear slots 142—a central wear slot, and one wear slot on each side of stator lining 114.

As shown in FIG. 1, slots 142 may extend all the way through the height or length of stator lining 114. In other embodiments, slots 142 do not extend all the way through the height or length of stator lining 114. As shown in FIG. 1, slots 142 may not extend all the way through the depth or thickness of stator lining 114. In other embodiments, slots 142 do extend all the way through the depth or thickness of stator lining 114. Slots 142 are shown as linear shaped, but other suitable configurations may be utilized. Though slot 122 is adapted to receive the tool, slots 142 are generally too narrow to fit the tool.

In operation of caliper brake 10, stator linings 114 will wear and become less thick. Thus, slots 142 will become less deep. During operation of caliper brake 10, slot 142 will be worn from its original depth to a subsequent depth. Slots 142 may be designed for a particular depth, such that a user will be able to identify, based on the subsequent depth, that stator linings 114 should be replaced. Stator linings 114 can be replaced by a user upon this identification. Slots 142 may also be helpful for controlling vibration and noise of caliper brake 10.

It is thus evident that a hydraulic caliper assembly constructed as described herein accomplishes the objects of the present invention and otherwise substantially improves the art.

What is claimed is:

1. A hydraulic caliper assembly comprising
a caliper brake housing including two opposing pairs of two piston assemblies, each of the pairs of two piston assemblies adapted to place a respective stator assembly of a pair of stator assemblies in a braking position,
wherein the caliper brake housing is a unitary, cast component having an internal fluid porting system fluidly coupling each of the piston assemblies with a source of hydraulic fluid, and
wherein each of the piston assemblies have a common configuration,
each of the piston assemblies including
a piston bore having a piston slideable therewithin, the piston bore having
a piston groove formed therein and carrying a piston seal, and
a piston boot groove formed therein and carrying a piston boot, the piston boot groove being spaced from the piston groove, and
a piston O-ring plug having a plug body portion adapted to fit within a portion of the piston bore.

2. The hydraulic caliper assembly of claim 1, the plug body portion including a body threading corresponding with a bore threading in the portion of the piston bore.

3. The hydraulic caliper assembly of claim 2, the piston O-ring plug having a protrusion extending from the plug body portion, wherein the protrusion is adapted to allow removal of the piston O-ring plug.

4. The hydraulic caliper assembly of claim 3, the protrusion having an outer perimeter and the plug body portion having an outer perimeter,
wherein the outer perimeter of the protrusion extends wider than the entire outer perimeter of the plug body portion.

5. The hydraulic caliper assembly of claim 3, wherein the protrusion is hexagonal shaped.

6. The hydraulic caliper assembly of claim 3, wherein the protrusion is square shaped.

7. The hydraulic caliper assembly of claim 1, wherein the internal fluid porting system includes
two fluid channels respectively fluidly coupling the opposing pairs of two piston assemblies, and
two fluid channels respectively fluidly coupling the two piston assemblies of each of the opposing pairs.

8. A hydraulic caliper assembly comprising
a caliper brake housing including two opposing pairs of two piston assemblies, each of the pairs of two piston assemblies adapted to place a respective stator assembly of a pair of stator assemblies in a braking position,
wherein the caliper brake housing is a unitary, cast component having an internal fluid porting system fluidly coupling each of the piston assemblies with a source of hydraulic fluid, and
wherein each of the piston assemblies have a common configuration,
the caliper brake housing including a pair of threaded holes each adapted to receive a respective bolt, each bolt being provided with a respective washer, and
wherein the pair of stator assemblies are secured within the caliper brake housing by a pair of torque pins, each of the torque pins being secured in the caliper brake housing by one of the respective bolts and one of the respective washers.

9. The hydraulic caliper assembly of claim 8, wherein a portion of each of the respective washers overlaps a portion of the respective torque pin.

10. A hydraulic caliper assembly comprising
a caliper brake housing including two opposing pairs of two piston assemblies, each of the pairs of two piston assemblies adapted to place a respective stator assembly of a pair of stator assemblies in a braking position,
wherein the caliper brake housing is a unitary, cast component having an internal fluid porting system fluidly coupling each of the piston assemblies with a source of hydraulic fluid, and
wherein each of the piston assemblies have a common configuration,
wherein each stator assembly of the pair of stator assemblies includes a respective backing plate having a tab as an extension of the backing plate,
wherein the tab includes a slot having a first end within the tab and a second end within the backing plate, wherein the slot defines a tool-engaging surface in the backing plate, such that a user can use a tool to apply sufficient force on the tool-engaging surface to thereby cause the respective stator assembly to move against the respective pair of piston assemblies,
the caliper brake housing further including a recess positioned over the pair of stator assemblies,
wherein each tab extends beyond an outer perimeter of the caliper brake housing and through the recess thereof, such that tabs are adapted to be grabbed by a user for rotation of the pair of stator assemblies,
the caliper brake housing further including a respective depression corresponding to the position of each of the tabs.

11. The hydraulic caliper assembly of claim 10, wherein the second end within the backing plate is a curved end.

* * * * *